United States Patent
Zhu et al.

(10) Patent No.: US 7,920,662 B2
(45) Date of Patent: Apr. 5, 2011

(54) EQUALIZER-BASED RECEIVER TO ELIMINATE TRAINING SEQUENCE INTERFERENCE IN TDD SYSTEMS

(75) Inventors: Linda Zhu, Beijing (CN); Yi-Miao Zhao, Beijing (CN); Ser-wah Oh, Johor (MY)

(73) Assignee: ST-Ericsson SA, Geneva (CH)

( * ) Notice: Subject to any disclaimer, the term of this patent is extended or adjusted under 35 U.S.C. 154(b) by 1042 days.

(21) Appl. No.: 11/729,427

(22) Filed: Mar. 28, 2007

(65) Prior Publication Data

US 2008/0123571 A1    May 29, 2008

(30) Foreign Application Priority Data

Apr. 3, 2006 (CN) .......................... 2006 1 0066561

(51) Int. Cl.
  *H04B 1/10* (2006.01)
(52) U.S. Cl. ........ 375/350; 375/148; 375/260; 375/265; 375/343; 375/346; 370/206; 370/342; 370/329; 370/328

(58) Field of Classification Search .................. 375/229, 375/316, 346, 260, 350, 148, 265, 343; 370/294, 370/342, 206, 329, 328
See application file for complete search history.

(56) References Cited

U.S. PATENT DOCUMENTS

| | | | | |
|---|---|---|---|---|
| 5,970,060 A | * | 10/1999 | Baier et al. ..................... | 370/342 |
| 7,065,371 B1 | * | 6/2006 | Kleinerman .................. | 455/464 |
| 2004/0184561 A1 | * | 9/2004 | Harada et al. ................. | 375/316 |
| 2006/0159187 A1 | * | 7/2006 | Wang et al. ..................... | 375/260 |
| 2008/0285692 A1 | * | 11/2008 | Buchert et al. ................ | 375/346 |

* cited by examiner

*Primary Examiner* — Eva Y Puente (57) ABSTRACT

Training sequence interference in an equalizer-based receiver in a time-division duplex (TDD) communication system can be avoided without using interference cancellation, by providing to the equalizer both the desired data portion of the received signal, and a portion of the training sequence that is adjacent the desired data portion and has a length commensurate with the delay spread associated with the training sequence interference. The portion of the equalizer output that corresponds to the adjacent training sequence portion can be discarded while retaining the desired equalized data.

20 Claims, 8 Drawing Sheets

EQUALIZER-BASED RECEIVER TO ELIMINATE TRAINING SEQUENCE INTERFERENCE IN TDD SYSTEMS

CROSS-REFERENCE TO RELATED APPLICATIONS

The present application is related to Chinese Patent Application No. 200610066561.7, filed Apr. 3, 2006, entitled "EQUALIZER-BASED RECEIVER FOR ELIMINATING TRAINING SEQUENCE INTERFERENCE IN A TIME-DIVISION DUPLEX (TDD) COMMUNICATION SYSTEM". Chinese Patent Application No. 200610066561.7 is assigned to the assignee of the present application and is hereby incorporated by reference into the present disclosure as if fully set forth herein. The present application hereby claims priority under 35 U.S.C. §119(a) to Chinese Patent Application No. 200610066561.7.

TECHNICAL FIELD

The present disclosure relates to time-division duplex (TDD) based communication systems, and particularly to systems and methods for eliminating training sequence interference.

BACKGROUND

Figure 1:
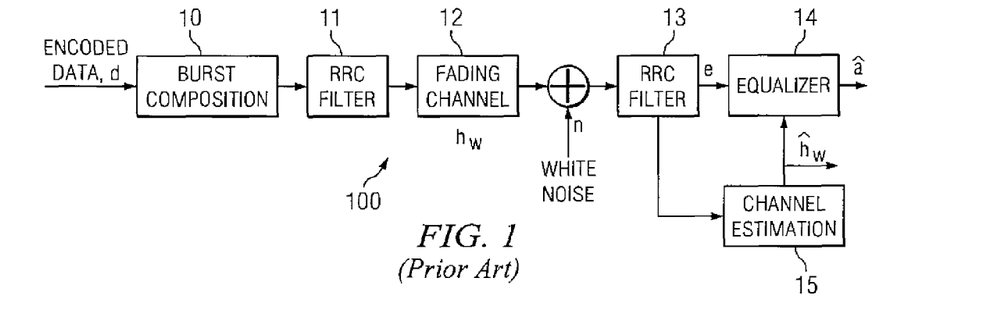
FIG. 1 shows a communication link for a TDD-based communication system according to the prior art.

FIG. 1 is a conventional base band-equivalent model 100 of a communication link for a TDD-based communication system. Signal d is formatted (burst composition 10) according to the relevant standard, e.g., Third Generation Partnership Project (3GPP) Low Chip Rate Time Division Duplex (LCR-TDD) system, 3GPP High Chip Rate Time Division Duplex (HCR-TDD) system and Global System for Mobile Communication (GSM). The formatted signal is then passed to a filter 11, which is normally a root-raised cosine (RRC) filter for shaping the transmitted pulse. This is a typical filter used in conventional communication systems.

The pulse-shaped signal is transmitted to a channel 12, which could be wired or wireless. The channel 12 has a fading component as well as a noise component. The fading component $h_w$ normally introduces a time delay of W chips, whilst the noise component n could be modeled as additive white Gaussian noise (AWGN). A typical fading scenario that causes delay spread is multi-path fading. Due to the effect of delay, inter-symbol interference (ISI) exists in the received signal.

In the receiver, a similar RRC filter 13 is used to match the transmitter RRC filter 11. The filtered signal e is passed to an equalizer 14 to remove the ISI effects. Channel estimates $\hat{h}_w$ are provided by a channel estimation unit 15.

Figure 2:
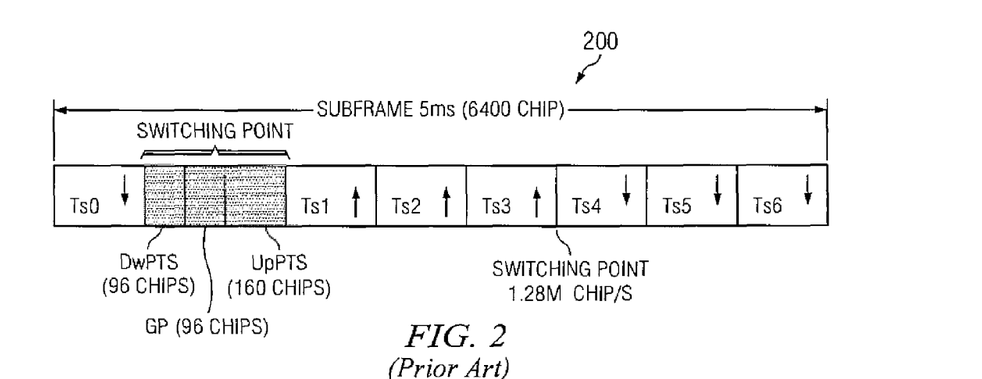
FIG. 2 shows the sub-frame structure of conventional TD-SCDMA.

As an example of a TDD system, an LCR-TDD system uses a frame length of 10 ms, and each 10 ms frame is divided into two sub-frames of 5 ms. Each sub-frame 200 includes seven normal time slots (see FIG. 2), and each slot is assigned either to uplink (or reverse link) or to downlink (or forward link). In FIG. 2, Tsn (n from 0 to 6) is the $n^{th}$ traffic time slot, 864 chips duration. DwPTS is: downlink pilot time slot, 96 chips duration. UpptS is: uplink pilot time slot, 160 chips duration and GP is: main guard period for TDD operation, 96 chips duration.

Figure 3:
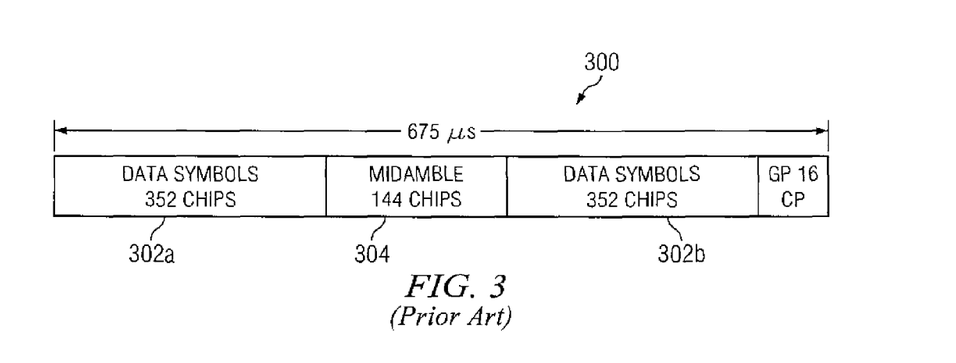
FIG. 3 shows the structure for normal time slot of FIG. 2.

As shown in FIG. 3, the normal time slot structure 300 of Tsn includes two data parts 302a and 302b in each slot, separated by a midamble 304, which is used for channel estimation.

Figure 4A:
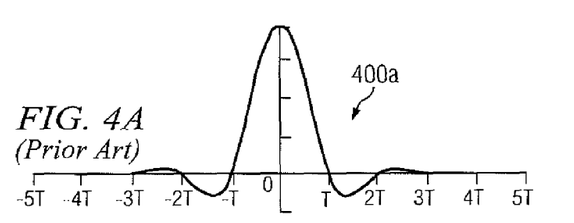
FIG. 4(a) shows a band-limited pulse having zeros periodically spaced in time.
Figure 4B:
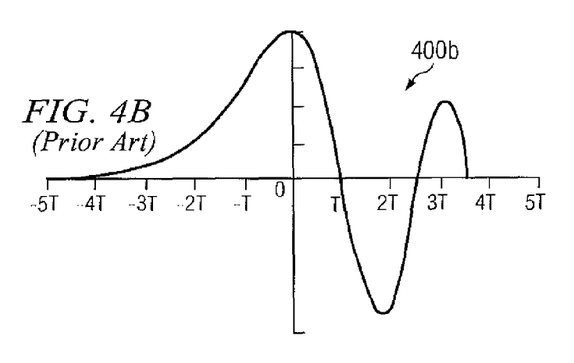
FIG. 4(b) shows the case of having zeros crossing that are no longer periodically spaced.
Figure 4C:
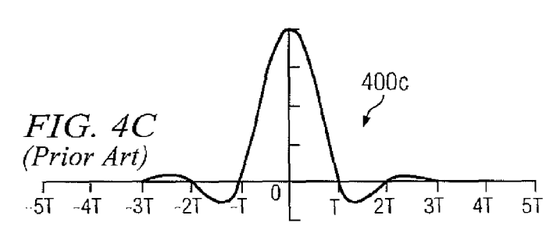
FIG. 4(c) illustrates the output of the equalizer of FIG. 1 that compensates for the linear distortion in the channel.

FIGS. 4(a)-(b) illustrate plots 400a, 400b and 400c the effect of fading on the received signal. FIG. 4(a) shows a band-limited pulse having zeros periodically spaced in time at points labeled ±T, ±2T, . . . . For an LCR TD-SCDMA system, T is equal to 0.78125 μs. Transmission of the pulse through a fading channel, however, results in the received pulse shown in FIG. 4(b) having zeros crossing that are no longer periodically spaced. FIG. 4(c) illustrates the output of a linear equalizer that compensates for the linear distortion in the channel.

As an example of training sequence interference in a TDD system, midamble interference is discussed as follows. An LCR TD-SCDMA timeslot 500 is shown as FIG. 5. The length of the channel window (the delay spread of the channel) is W. E1 and E2 respectively include first and second 352-chip wide data blocks. The length of both E1 and E2 is 352+W−1 chips, to account for the fact that, due to the delay spread of W chips, the 352 chips of E1 data and the 352 chips of E2 data may need to be recovered from respective portions of the time slot that are each 352+W−1 chips wide. Because the midamble lies in the middle of the time slot, and W is larger than 1 (e.g., 16), the midamble will interfere with E1 and E2. The effect of the midamble interference 502a and 502b is shown as the shaded part of FIG. 5.

Figure 5:
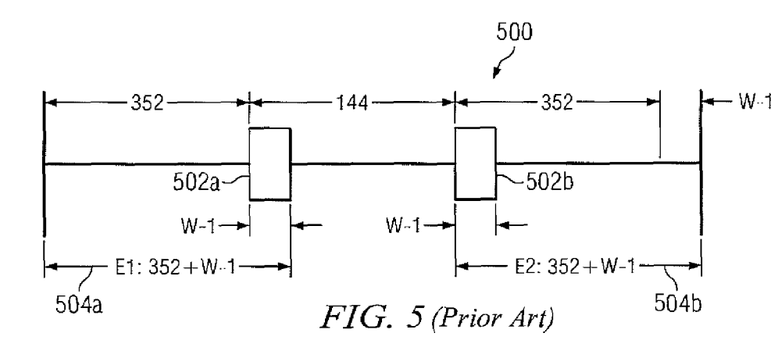
FIG. 5 shows the effect of midamble interference spread to the data parts of the time slot of FIG. 3.

The midamble interference 502a on the first data part 504a can be written as:

$$I_1 = H_1 M_1 \quad \text{(Eqn. 1)}$$

In Equation 1, $H_1$ is a matrix consisting of the elements of the channel impulse response estimation, with dimension $(W-1) \times (W-1)$. $H_1 = H_1(i, j)$ can be written as:

$$H_1(i, j) = \begin{cases} h(i-j) & \text{for } 0 \leq i-j \leq W-1 \\ 0 & \text{else} \end{cases} \quad \text{(Eqn. 2)}$$

In Equation 2, $h(i-j)$, $0 \leq i-j \leq W-1$ is the estimation of channel impulse response and $M_1 = [m(0), m(1), \ldots m(W-2)]^T$ is a vector with dimension W−1, and m(i) ($0 \leq i \leq W-2$) is the elements of midambles.

The midamble interference 502b on the second data part 504b could be written as shown in Equation 3 below.

$$I_2 = H_2 M_2 \quad \text{(Eqn. 3)}$$

In Equation 3, $H_2$ is a matrix consisting of the elements of the channel impulse response estimation, with dimension $(W-1) \times (W-1)$. $H_2 = H_2(i, j)$ could be written as shown in Equation 4 below.

$$H_2(i, j) = \begin{cases} h(W-1+i-j) & \text{for } 0 \leq j-i \leq W-1 \\ 0 & \text{else} \end{cases} \quad \text{(Eqn. 4)}$$

For the last W−1 chips of block E1 could be written as shown in Equation 5 below.

$$E1 = H_1 * D + I_1 + n \quad \text{(Eqn. 5)}$$

The four W−1 chips of block E2 can be written as shown in Equation 6 below.

$$E2 = H_2 * D_2 + I_2 + n \quad \text{(Eqn. 6)}$$

In Equation 6, D is the transmitted data, and n is white noise. If $I_1$ and $I_2$ are ignored, the error probability will increase for the last W−1 chips of estimated data block $\hat{d}_1$ and the first W−1 chips of the estimated data block $\hat{d}_2$.

A conventional equalizer could reduce the degrading effect of ISI. The equalizer is supplied with an estimate of the channel impulse response $\hat{h}_w$ associated with the propagation channel.

In the downlink, all signals are distorted by the same propagation channel. This multi-path propagation channel destroys the orthogonality of the spreading codes and therefore causes multiple-access interference (MAI). To a large extent, the orthogonality of user codes can be restored and MAI can be suppressed by employing channel equalization.

Figure 6:
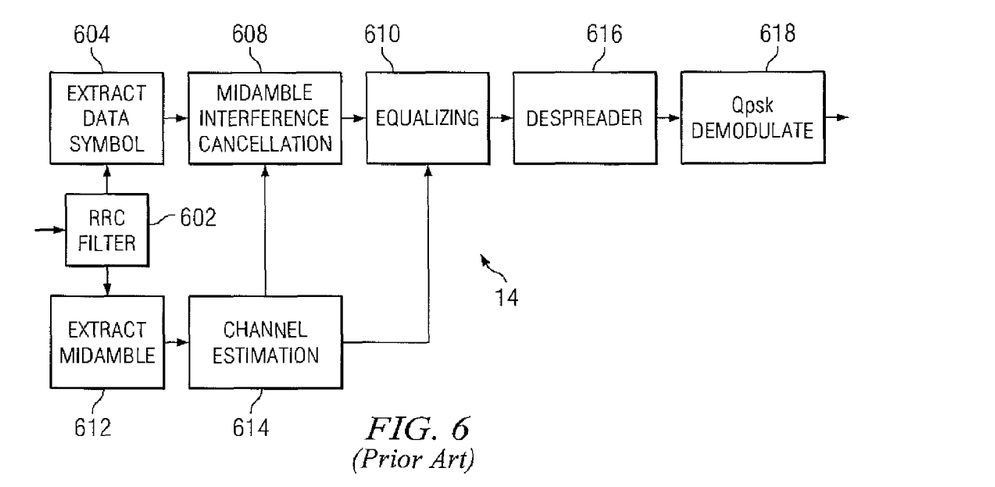
FIG. 6 shows the structure of the equalizer of FIG. 1 for downlink.

The structure of the conventional equalizer 14 for the downlink is shown in FIG. 6. Conventional equalizer 14 includes an RRC Filter 602, an extract data symbol block 604, a midamble interference cancellation block 608 and an equalizing block 610. Equalizer 14 also includes an extract midamble block 612 and channel estimation block 614. Equalizer 14 also includes a despreader block 616 and Qpsk demodulate block 618.

Assuming the channel equalizer is linear and can be represented by the estimation matrix $\hat{A}$, which is independent of user codes, the estimate of the sum vector for data $\hat{S}_d$ could be written as shown in Equation 7 below.

$$\hat{S}_d = \hat{A}e \quad \text{(Eqn. 7)}$$

The choice of $\hat{A}$ determines the channel equalizer types. Three most common types are listed below as Equations 8-10.

$$\text{Matched filtering: } \hat{S}_{MF} = H^H{}^* e \quad \text{(Eqn. 8)}$$

$$\text{Zero forcing: } \hat{S}_{ZF} = (H^H{}^*H)^{-1} H^H{}^* e \quad \text{(Eqn. 9)}$$

$$\text{Minimum mean square error: } \hat{S}_{MMSE} = (H^H{}^*H + \sigma^2)^{-1} H^H{}^* e \quad \text{(Eqn. 10)}$$

In order to avoid complex receiver processing tasks such as Cholesky decomposition for solving matrix inversions, channel equalization can be performed efficiently in the frequency domain using fast Fourier transform (FFT) as follows $$\hat{s}_{MF} = F^{-1}\left(\left(F(\hat{h})\right)^* * F(e)\right) \quad \text{(Eqn. 11)}$$

$$\hat{s}_{ZF} = F^{-1} \frac{\left(F(\hat{h})\right)^*}{\left(F(\hat{h})\right)^* * F(\hat{h})} F(e) \quad \text{(Eqn. 12)}$$

$$\hat{s}_{MMSE} = F^{-1} \frac{\left(F(\hat{h})\right)^*}{\left(F(\hat{h})\right)^* * F(\hat{h}) + \sigma^2} F(e) \quad \text{(Eqn. 13)}$$

In Equations 11-13, F denotes the FFT, $F^{-1}$ is the inverse FFT and * denotes the complex conjugate.

Figure 7:
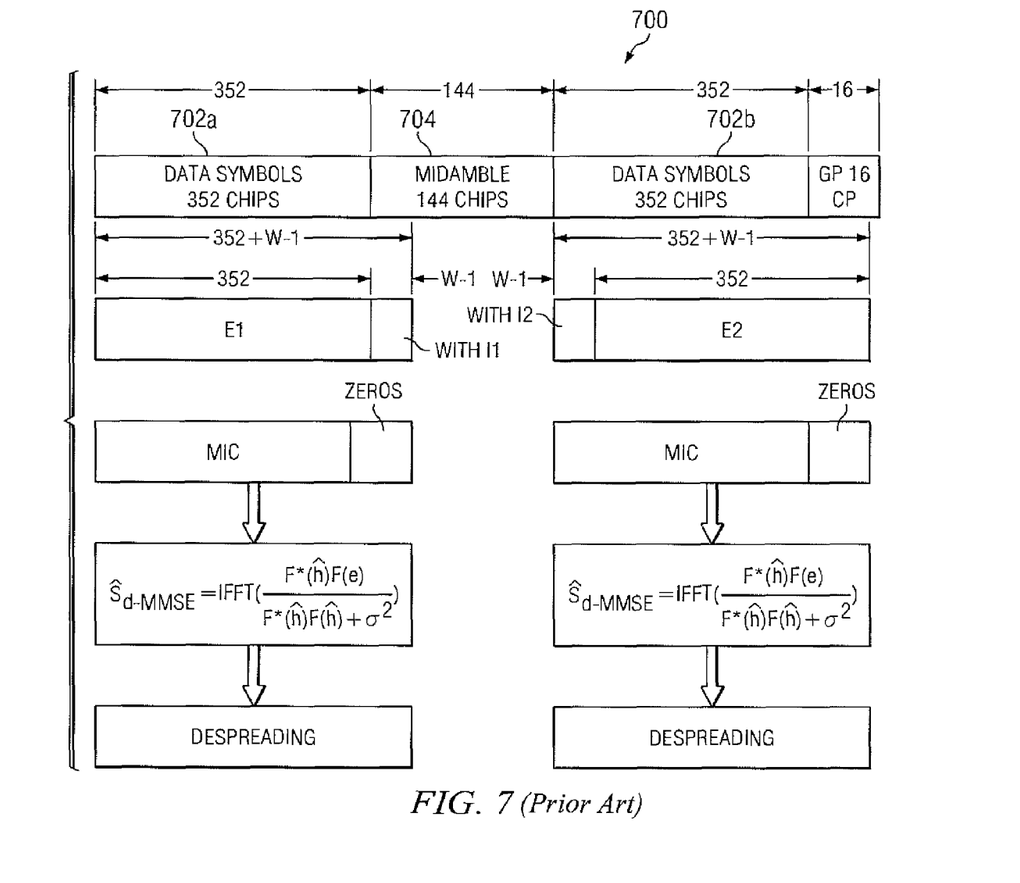
FIG. 7 shows the operation of the of FIG. 6 structure.

A conventional equalizer with MIC (midamble interference cancellation) 700 is depicted in FIG. 7. Instead of passing 352 data chips to the equalizer, an additional W–1 chips are required due to the effect of delay spread. If these 352+W–1 data chips are passed to the equalizer directly, the data chips in the overlap regions between the data 702a and 702b and midamble 704 are likely to contain more interference. Therefore, normally a MIC scheme is necessary to remove the interference before passing the 'cleaner' data for subsequent processing.

Before equalizing, midamble interference cancellation is performed, that is $$E1' = E1 - I_1 \quad \text{(Eqn. 14)}$$

$$E2' = E2 - I_2 \quad \text{(Eqn. 15)}$$

Under the condition of beam forming, there are different channels corresponding to different users. At most, there are 16 different radio channels. In this case, the above MIC operation has to be executed 16 times, which will cost around 2-3 million instructions per second (MIPS) in a typical dual-MAC DSP. In addition, since channel estimation is used for assisting MIC, errors in channel estimation will propagate into errors in MIC, thus, introducing additional error into the whole system.

The following documents are incorporated herein by reference:

[1] Ingolf Held and Almansor Kerroum, "TD-SCDMA Mobile Station Receivers: Architecture, Performance, Impact of Channel Estimation" in *Proc China Wireless Congress*, 2002; and

[2] B. Steiner and P. W. Baier, "Low Cost Channel Estimation in the Uplink Receiver of CDMA Mobile Radio Systems", *Frequenz*, Vol. 47, pp. 292-298, November/December 1993.

There is therefore a need for improved systems and methods to provide a low-complexity, high performance solution that can remove training sequence interference in TDD communication system receivers.

SUMMARY

One embodiment of the present disclosure is to provide a new method for eliminating training sequence (or pilot or training sequence or any other known sequence) interference in an equalizer-based receiver in a TDD-based communication system.

In one embodiment, the present disclosure provides a a method for eliminating training sequence interference in a time-division duplex (TDD) communication system for use in a communication receiver. The method includes receiving a signal having a training sequence and a data block. The method also includes extracting from the received signal data that includes a desired data portion of the received training sequence. The portion of the training sequence adjacently neighbors the desired data portion and has a length commensurate with a delay spread associated with the training sequence interference. The desired data portion having a length commensurate with a length of the data block combined with the delay spread. The method also includes obtaining a channel estimation based on the training sequence and equalizing the extracted data based on the channel estimation to produce equalized data. The method further includes obtaining desired data by discarding a portion of the equalized data, the discarded portion corresponding to the portion of the received training sequence and having a length commensurate with the delay spread.

In another embodiment, the present disclosure provides a communication receiver. The receiver includes an input to receive a signal having a training sequence and a data block. The receiver also includes a data extracting unit coupled to the input and to extract a desired data portion and a portion of the training sequence from the received signal. The portion of the training sequence adjacently neighbors the desired data portion and has a length commensurate with a delay spread associated with training sequence interference data. The desired data portion comprises a length commensurate with a length of the data block combined with the delay spread. The receiver includes a channel estimation unit coupled to the input to obtain a channel estimation based on the training sequence. The receiver also includes an equalizing unit coupled to the data extracting unit and the channel estimation unit to equalize the extracted data based on the channel estimation to produce equalized data. The receiver could further include a data obtaining unit coupled to the equalizing unit for obtaining desired data by discarding a portion of the equalized data. The discarded portion corresponds to the portion of the training sequence and has a length commensurate with the delay spread.

In still another embodiment, the present disclosure provides a communication receiver for use in a time-division duplex (TDD) communication system. The receiver includes a input to receive a signal having a training sequence and a data block. The receiver also includes a data extracting unit coupled to the input and configured to extract a desired data portion and a portion of the training sequence from the received signal. The receiver further includes a channel estimation unit coupled to the input to obtain a channel estimation based on the training sequence. The receiver could also include an equalizing unit coupled to the data extracting unit and the channel estimation unit to equalize the extracted data based on the channel estimation to produce equalized data. The receiver could still further include a data obtaining unit coupled to the equalizing unit for obtaining desired data by discarding a portion of the equalized data, wherein the discarded portion corresponds to the portion of the training sequence and has a length commensurate with the delay spread.

Other technical features may be readily apparent to one skilled in the art from the following figures, descriptions and claims.

BRIEF DESCRIPTION OF THE DRAWINGS

For a more complete understanding of this disclosure and its features, reference is now made to the following description, taken in conjunction with the accompanying drawings, in which:

FIG. 4(a)-(b) illustrate the effect of fading on the received signal of FIG. 1;

DETAILED DESCRIPTION

FIGS. 1 through 14, discussed herein, and the various embodiments used to describe the principles of the present invention in this patent document are by way of illustration only and should not be construed in any way to limit the scope of the invention. Those skilled in the art will understand that the principles of the present invention may be implemented relative to any suitable data processing application.

Although an LCR-TDD system is used herein for exposition of exemplary applications of the present disclosure, an embodiment of the present disclosure is applicable to all TDD-based systems that use a training sequence (or pilot or any other known sequence) and an equalizer at the receiver. One embodiment of the present disclosure is also applicable to any other channel scenario that could introduce delay spread from the training sequence to the received signal.

Figure 8:
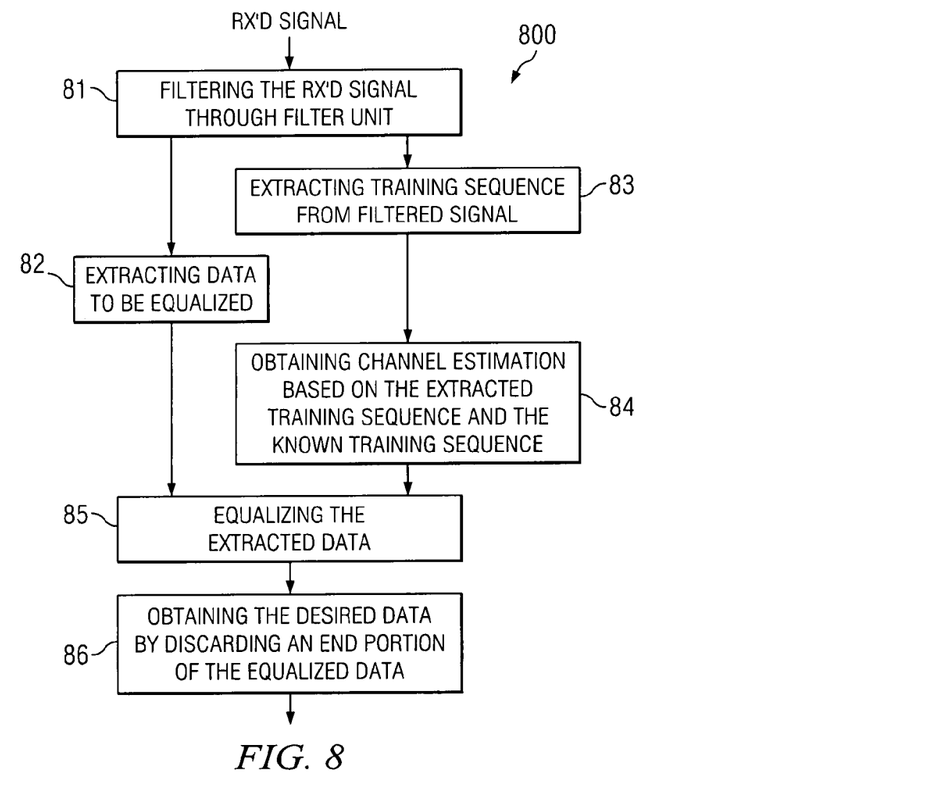
FIG. 8 shows the processing flow of a method for eliminating training sequence interference in an equalizer-based receiver according to one embodiment of the present disclosure.

FIG. 8 shows processing flow of method for eliminating training sequence interference in an equalizer-based receiver in a time-division duplex (TDD) based communication system, according to exemplary embodiments of the present disclosure. In the filtering step 81, the received signal is filtered through a filter unit. The received signal includes a training sequence and a data block. In the data extracting step 82, the data to be equalized by an equalizing unit, is extracted from the filtered signal. The extracted data includes (1) a desired data portion that includes the received data block, (2) and a portion of the received training sequence. The desired data portion is that portion of the received signal from which the desired data of the received data block may be recovered, and as such, accounts for the delay spread of the channel. FIG. 5 illustrates examples of desired data portions E1 and E2, that each includes both a 352-chip portion of the time slot dedicated to the data, and an additional W−1 chip portion of the time slot that corresponds to the delay spread of the channel. The extracted portion of the received training sequence adjacently neighbors the desired data portion and has a length commensurate with the delay spread of the channel. In the training sequence extracting step 83, the training sequence is extracted from the filtered signal. In the channel estimation step 84, channel estimation is obtained based on the extracted training sequence and the known training sequence. In the equalizing step 85, the extracted data is equalized based on the channel estimation, and the equalized data is obtained. And in the data obtaining step 86, the desired data is obtained by discarding an end portion of the equalized data. The discarded end portion corresponds to the aforementioned adjacently neighboring training sequence portion and has a length commensurate with the delay spread of the channel.

Figure 9:
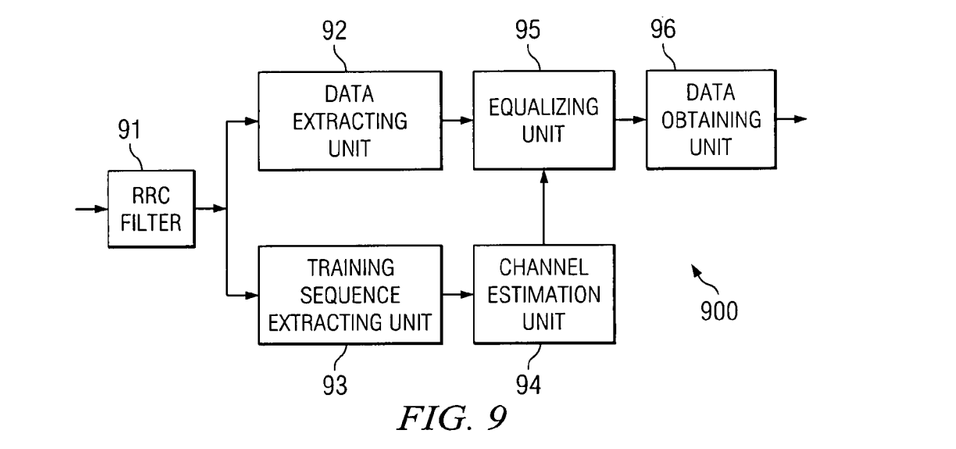
FIG. 9 shows the equalizer-based receiver for eliminating training sequence interference, according to one embodiment of the present disclosure.

FIG. 9 shows pertinent portions of an equalizer-based receiver 900 used in a TDD (wired or wireless) communication system, for eliminating training sequence interference, according to exemplary embodiments of the present disclosure. The receiver comprises a filter unit 91 that filters the received signal, the received signal including a training sequence and data block. The data extracting unit 92 extracts data to be equalized from the filtered signal. The extracted data includes (1) a desired data portion that includes the received data block, and (2) a portion of the received training sequence. The portion of the received training sequence adjacently neighbors the desired data portion and has a length commensurate with the delay spread of the channel (equal to the delay spread in some embodiments). The training sequence extracting unit 93 extracts the training sequence from the filtered signal. The channel estimation unit 94 obtains channel estimation based on the extracted training sequence and the known training sequence. The equalizing unit 95 equalizes the extracted data, based on the channel estimation, and obtains the equalized data. The data obtaining unit 96 obtains the desired data by discarding an end portion of the equalized data. The discarded end portion corresponds to the aforementioned adjacently neighboring training sequence and has a length commensurate with the delay spread of channel (equal to the delay spread in some embodiments).

Taking the above midamble interference as example, the last W−1 chips of E1 and the first W−1 chips of E2 could be shown by Equation 16 below.

$$E = H*D + I_m + n \quad \text{(Eqn. 16)}$$

In Equation 16, D is the transmitted data, $I_m$ is interference of midamble and n is the white noise. If only D and n are considered, ignoring the influence of $I_m$, the bit error rate will increase for the last W−1 chips of the estimated block $\hat{d}_1$ and the first W−1 chips of the estimated block $\hat{d}_2$. However, the channel length is finite (W chips), that is to say, midamble interference only affects the last W−1 chips of the first desired data portion (associated with E1) and the first W−1 chips of the second desired data portion (associated with E2). Additional (W−1) chips of neighboring midamble are therefore added to the tail of the first desired data portion and to the head of the second desired data portion, and all data then passes directly to the equalizer without doing MIC. After equalizing, there are 352+(W−1) chips of $\hat{d}_1$ corresponding to E1, and 352+(W−1) chips of $\hat{d}_2$ corresponding to E2. Without MIC, the last (W−1) chips of $\hat{d}_1$ and the first (W−1) chips of $\hat{d}_2$ may be inaccurate. These parts are not wanted anyway, and can thus be discarded. The rest of $\hat{d}_1$ and $\hat{d}_2$ are sent to the match filter.

Figure 10:
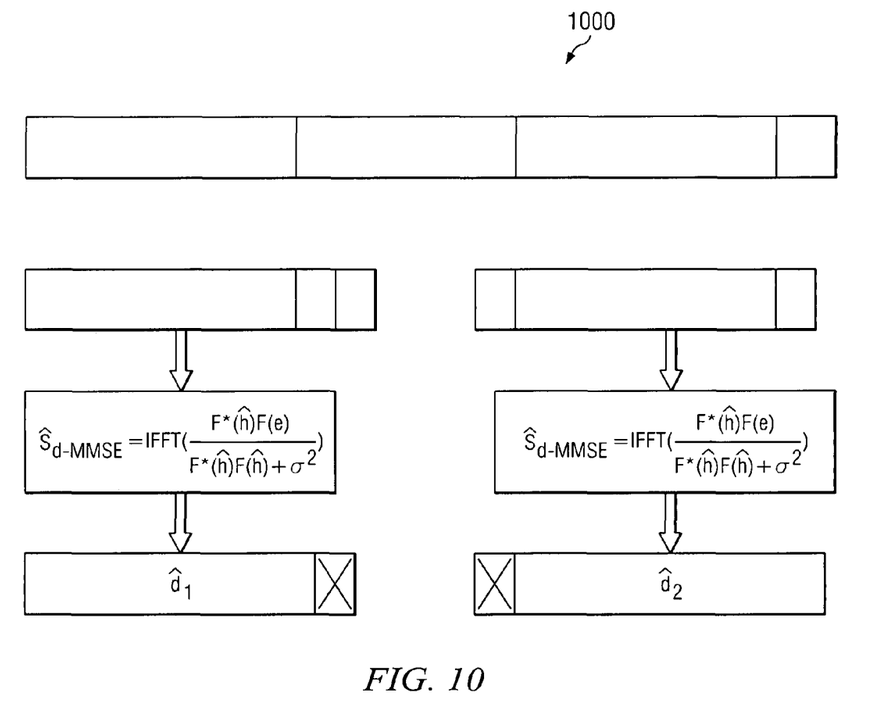
FIG. 10 shows the receiver architecture without MIC, according to one embodiment of the present disclosure.

In one embodiment, instead of passing the conventional 352+(W−1) chips data to the equalizer, 352+(W−1)*2 data chips from the input signals are extracted and sent to the equalizer as seen in FIG. 10. In other words, additional W−1 neighbouring midamble chips are appended to the tail of E1 and to the head of E2.

In the conventional equalizer with MIC, 352+W−1 chips1 data are fed into, MIC, then padded with zeros for equalizing (FFTs) (see FIG. 7).

According to one embodiment of the present disclosure, neighboring parts of midamble are appended the tail of E1 and to the head of E2 respectively. These data feed into the equalizer (FFTs) block directly (see FIG. 10).

At the output of the equalizer, only the useful 352 data chips are used for the de-spreading process. The excess midamble data chips are discarded. In the prior art equalizer with MIC, the midamble interference is eliminated by MIC before the data chips are passed to the equalizer. In contrast, one embodiment of the present disclosure equalizes, without MIC, appending neighbouring midamble chips to the data, so the midamble interference will be present outside the desired data range. Note that one embodiment of the present disclosure need not increase any complexity of the equalizer.

Based on arguments above, the simplified receiver structure 1000 is designed as shown in FIG. 10.

Figure 11:
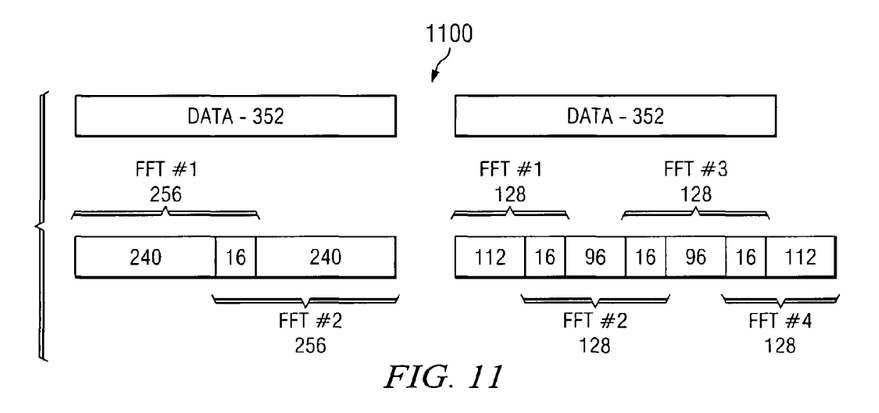
FIG. 11 shows an example of overlap for FFT utilizing smaller FFT lengths.

Since equalizing is done using the FFT, the effects of using various FFT lengths can be compared to the conventional equalizer with MIC As the length of each data part (E1 or E2) is 352 and the delay spread is W, the minimum FFT lengths required are 352·+W and 352+2*W points, respectively for the conventional and the inventive methods. In order to achieve the same performance, overlaps of a length W are needed when using FFT with a length lower than the minimum required lengths as depicted in relationship 1100 FIG. 11. Therefore, this relationship can be expressed in a general equation $$\text{Conventional: } n*l - (n-1)*W \geq 352 + W \quad \text{(Eqn. 17)}$$

$$\text{Present Disclosure: } n*l - (n-1)*W \geq 352 + 2*W \quad \text{(Eqn. 18)}$$

In these equations, n is the number of FFTs required for each received data block and l is the length of the FFT. Re-arranging Equations 16 and 17, Equation 18 below results.

Conventional:

$$n \geq \frac{352}{l-W} \text{ or } n = \left\lceil \frac{352}{l-W} \right\rceil \quad \text{(Eqn. 19)}$$

Present Disclosure $$n \geq \frac{352 + W}{l - W} \text{ or } n = \left\lceil \frac{352 + W}{l - W} \right\rceil \quad \text{(Eqn. 20)}$$

In these Equations, ⌈x⌉ denotes the smallest integer greater than or equal to x.

Table 1 shows the number of FFTs required for both the conventional and inventive methods based on Equations 19 and 20 for a typical value of W=16. It can be seen that there is no increased complexity in the FFT using a method according to one embodiment of the present disclosure.

TABLE 1

Comparison of complexities for conventional and equalizer according to one embodiment of the present disclosure (W = 16)

| L | n (Conventional) | n (Present Disclosure) |
|---|---|---|
| 512 | 1 | 1 |
| 256 | 2 | 2 |
| 128 | 4 | 4 |
| 64 | 8 | 8 |

Figure 12:
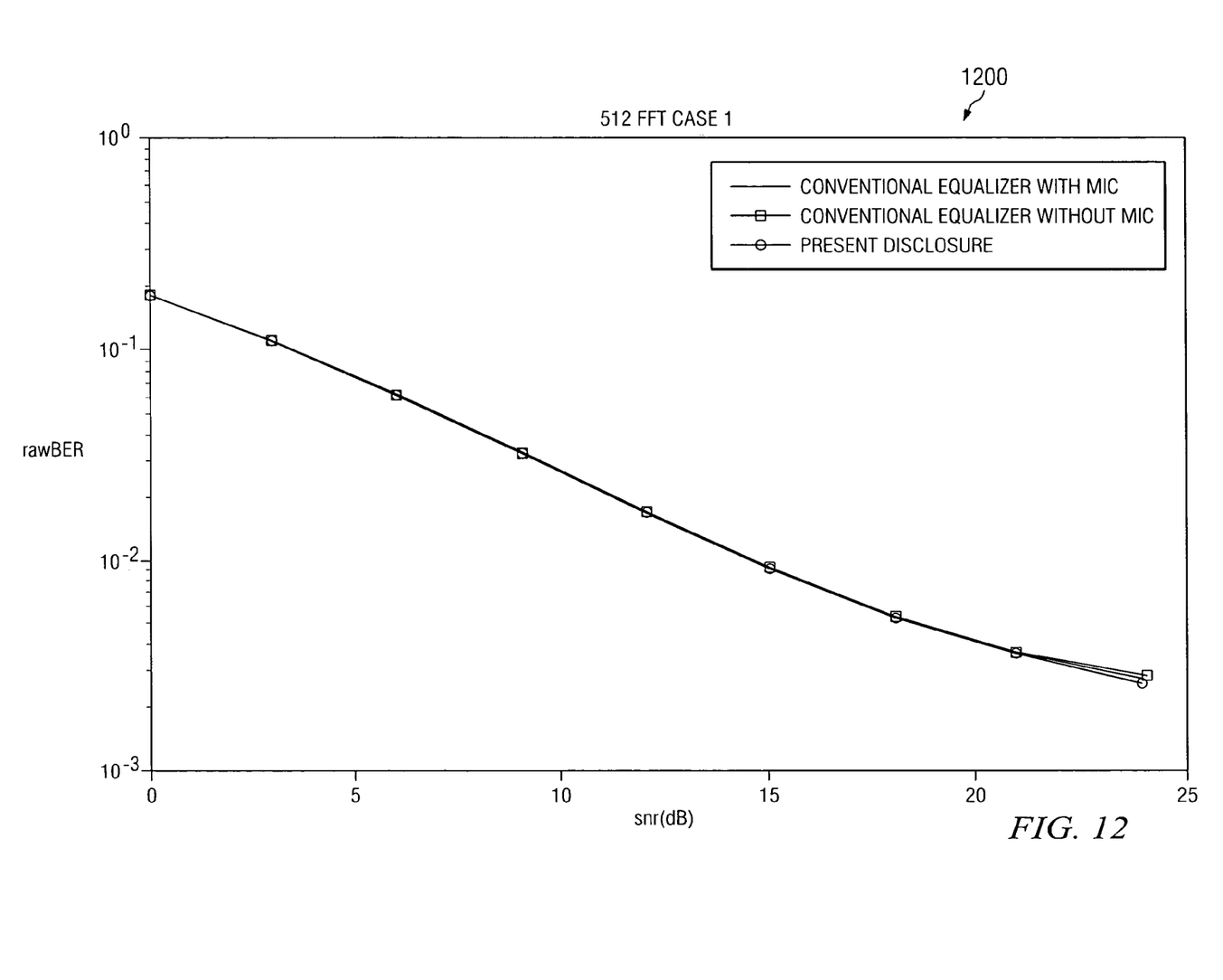
FIGS. 12-14 show comparisons of average BER performances for a conventional equalizer with MIC and an exemplary embodiment of the present disclosure.
Figure 13:
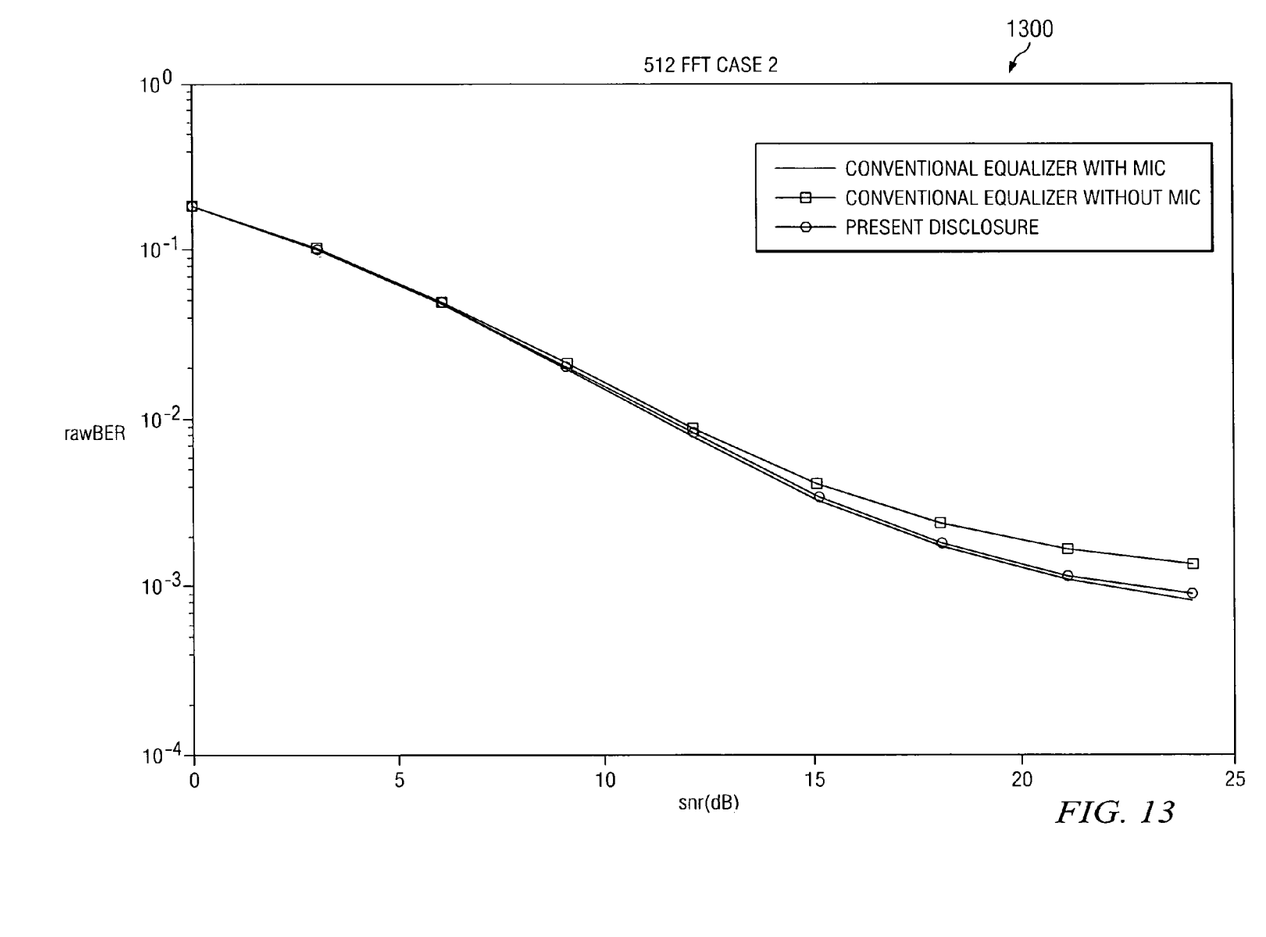
Figure 14:
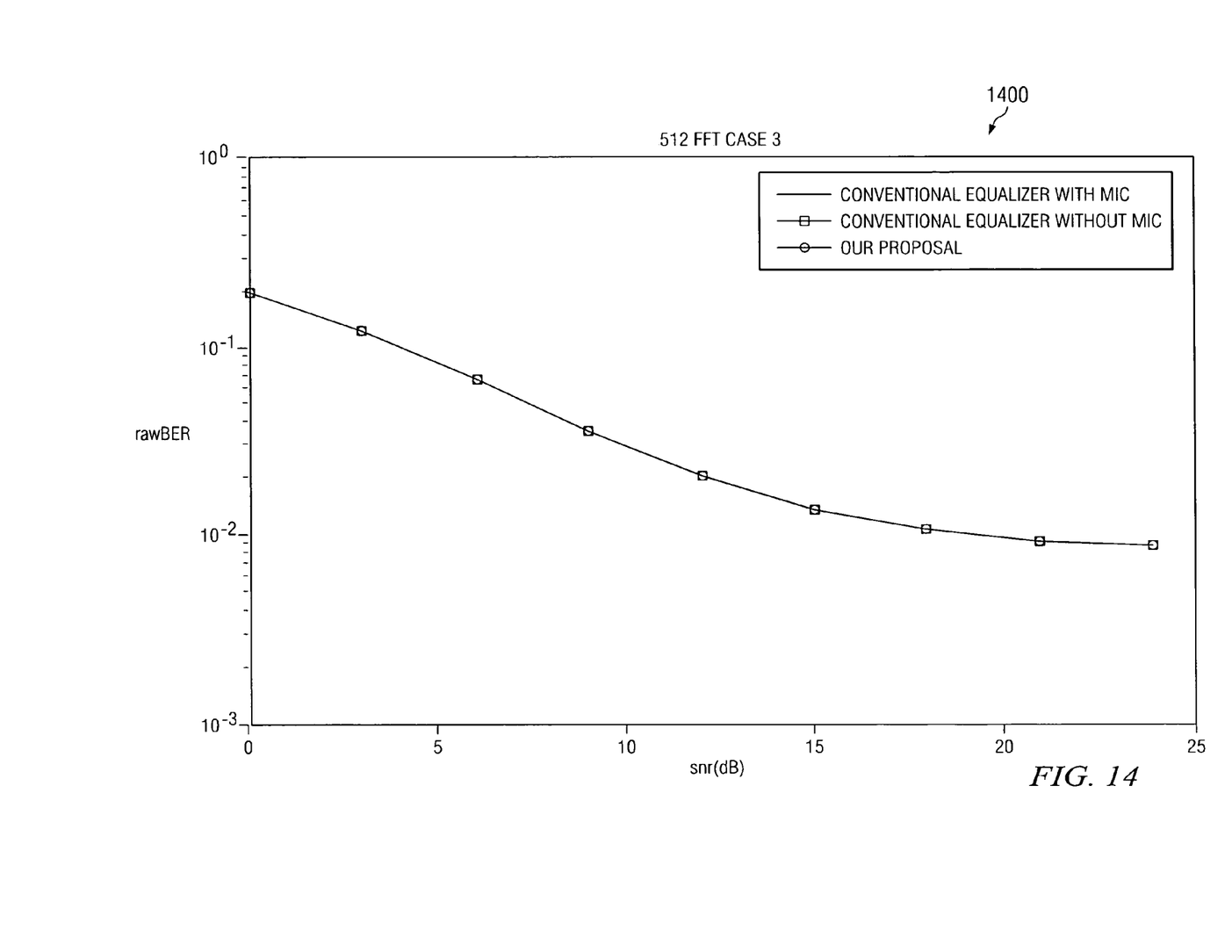

Exemplary simulation results are presented in FIGS. 12-14 based on FFT length 512. Nevertheless, the same trend can be observed utilizing different FFT lengths. The propagation channel is based on 3GPP proposed channel model, including case 1, case 2 and case 3. Table 2 presents the detailed description of case 1, case 2, and case 3.

TABLE 2

Propagation Channel Conditions Specified for TD-SCDMA Receiver Conformance Testing

| | | Relative Delay[ns]/Relative Power[dB] | | |
|---|---|---|---|---|
| Tap | Static | Case1(3 km/h) | Case2(3 km/h) | Case3(120 km/h) |
| 1 | 0/0 | 0/0 | 0/0 | 0/0 |
| 2 | n/a | 3125/−10 | 3125/0 | 781/−3 |
| 3 | n/a | n/a | 11720/0 | 1563/−6 |
| 4 | n/a | n/a | n/a | 2344/−9 |

The simulation results indicate that under the case when the multi-path delay is very large (case 2), the performance of the conventional equalizer without MIC degrades. However, the performance of the inventive equalizer structure (without MIC) is the same as the conventional equalizer with MIC.

Accordingly, embodiments of the present disclosure are very reliable and stable. In all test cases the performance is the same as the conventional equalizer with MIC.

FIG. 12 is a comparison 1200 of average BER performance under case 1 for: i) conventional equalizer with MIC; ii) conventional equalizer without MIC and iii) an exemplary embodiment of the present disclosure.

FIG. 13 is a comparison 1300 of average BER performance under case 2 for: i) conventional equalizer with MIC; ii) conventional equalizer without MIC and iii) an exemplary embodiment of the present disclosure.

FIG. 14 is a comparison 1400 of average BER performance under case 3 for: i) conventional equalizer with MIC; ii) conventional equalizer without MIC and iii) an exemplary embodiment of the present disclosure.

Exemplary embodiments of the present disclosure are readily implemented, with respect to conventional systems, and can achieve better performance. In an LCR-TDD system, there is no additional memory cost and MIPS cost compared with the conventional equalizer. Moreover, when comparing with the conventional equalizer combined with MIC, about 0.5 k words memory cost and 2-3 MIPS cost are saved, without performance degradation.

Exemplary embodiments of the present disclosure are very robust. Under the test conditions specified in 3GPP, the performance of the exemplary embodiments is the same as that of the conventional equalizer with MIC. The conventional equalizer receiver with MIC is affected directly by errors from channel estimation while the exemplary embodiments simplified architecture is less prone to such errors.

Accordingly, exemplary embodiments of the present disclosure could avoid training sequence interference without using interference cancellation, by providing to the equalizer both the desired data portion of the received signal, and a portion of the training sequence that is adjacent the desired data portion and has a length commensurate with the delay spread associated with the training sequence interference. The portion of the equalizer output that corresponds to the adjacent sequence portion can be discarded, while retaining the desired equalized data.

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for eliminating training sequence interference in a time-division duplex (TDD) communication system, the method comprising:
    receiving a signal having a training sequence and a data block;
    extracting data from the received signal data that includes a desired data portion and a training sequence portion, the training sequence portion adjacently neighboring the desired data portion and having a length commensurate with a delay spread associated with the training sequence interference, the desired data portion having a length commensurate with a length of the data block combined with the delay spread;
    obtaining a channel estimation based on the extracted training sequence portion and a known training sequence;
    equalizing the extracted data based on the channel estimation to produce equalized data; and
    obtaining desired data by discarding a portion of the equalized data, the discarded portion corresponding to the training sequence portion and having a length commensurate with the delay spread.

2. The method according to claim 1, wherein the received signal is formatted according to a standard of the TDD communication system.

3. The method according to claim 1, wherein the TDD communication system is a Low Chip Rate Time Division Duplex (LCR-TDD) system.

4. The method according to claim 1, wherein the TDD communication system is a High Chip Rate Time Division Duplex (HCR-TDD) system.

5. The method according to claim 1, wherein the TDD communication system is a Global System for Mobile Communication (GSM).

6. The method according to claim 1, wherein the training sequence is a midamble portion of the received signal.

7. The method according to claim 1, wherein the equalizing further comprises performing an FFT.

8. The method according to claim 1, wherein the length of the desired data portion is commensurate with a sum of the length of the data block and the delay spread.

9. A communication receiver comprising:
    an input to receive a signal having a training sequence and a data block;
    a data extracting unit coupled to the input and to extract a desired data portion and a training sequence portion from the received signal, wherein the training sequence portion adjacently neighbors the desired data portion and has a length commensurate with a delay spread associated with training sequence interference data, wherein the desired data portion comprises a length commensurate with a length of the data block combined with the delay spread;
    a channel estimation unit coupled to the input to obtain a channel estimation based on the extracted training sequence portion and a known training sequence;
    an equalizing unit coupled to the data extracting unit and the channel estimation unit to equalize the extracted data based on the channel estimation to produce equalized data; and
    a data obtaining unit coupled to the equalizing unit for obtaining desired data by discarding a portion of the equalized data, wherein the discarded portion corresponds to the training sequence portion and has a length commensurate with the delay spread.

10. The receiver according to claim 9, wherein the received signal is formatted according to a standard of TDD communication system.

11. The receiver according to claim 9, wherein the TDD communication system is a Low Chip Rate Time Division Duplex (LCR-TDD) system.

12. The receiver according to claim 9, wherein the TDD communication system is a High Chip Rate Time Division Duplex (HCR-TDD) system.

13. The receiver according to claim 9, wherein the TDD communication system is a Global System for Mobile Communication (GSM).

14. The receiver according to claim 9, wherein the training sequence is a midamble portion of the received signal.

15. The receiver according to claim 9, wherein the equalizer implements an FFT.

16. The receiver according to claim 9, wherein the length of the desired data portion is commensurate with a sum of the length of the data block and the delay spread.

17. For use in a time-division duplex (TDD) communication system, a communication receiver comprising:

an input to receive a signal having a training sequence and a data block;

a data extracting unit coupled to the input and configured to extract a desired data portion and a training sequence portion from the received signal;

a channel estimation unit coupled to the input to obtain a channel estimation based on the extracted training sequence portion and a known training sequence;

an equalizing unit coupled to the data extracting unit and the channel estimation unit to equalize the extracted data based on the channel estimation to produce equalized data; and a data obtaining unit coupled to the equalizing unit for obtaining desired data by discarding a portion of the equalized data, wherein the discarded portion corresponds to the training sequence portion and has a length commensurate with a delay spread.

18. The receiver of claim 17, wherein the training sequence portion adjacently neighbors the desired data portion and has a length commensurate with the delay spread associated with training sequence interference data.

19. The receiver of claim 18, wherein the desired data portion comprises a length commensurate with a length of the data block combined with the delay spread.

20. The receiver according to claim 17, wherein the length of the desired data portion is commensurate with a sum of the length of the data block and the delay spread.

* * * * *